(12) United States Patent
Kilby et al.

(10) Patent No.: US 8,562,280 B1
(45) Date of Patent: Oct. 22, 2013

(54) WAREHOUSE STORAGE SYSTEM (75) Inventors: Scott Kilby, Scotts, NC (US); Jeremiah Kerley, Wilkesboro, NC (US); David Wilmoth, Boomer, NC (US)

(73) Assignee: ECMD, Inc., North Wilkesboro, NC (US)

( * ) Notice: Subject to any disclaimer, the term of this patent is extended or adjusted under 35 U.S.C. 154(b) by 35 days.

(21) Appl. No.: 13/175,308

(22) Filed: Jul. 1, 2011

(51) Int. Cl.
*B65G 47/22* (2006.01)
*B27B 31/04* (2006.01)
*A47F 7/00* (2006.01)

(52) U.S. Cl.
USPC .......... 414/777; 411/781; 411/784; 411/799; 211/49.1

(58) Field of Classification Search
USPC ............... 414/779, 782, 781, 784, 754, 777; 211/49.1, 86.01, 104, 189, 195
See application file for complete search history.

(56) References Cited

U.S. PATENT DOCUMENTS

| | | | | |
|---|---|---|---|---|
| 2,828,933 A * | 4/1958 | De Pew et al. | 108/53.5 |
| 3,157,424 A * | 11/1964 | Hall | 294/68.3 |
| 3,651,955 A * | 3/1972 | Shkredka | 414/779 |
| 3,675,788 A * | 7/1972 | Cathers | 414/784 |
| 3,866,767 A | 2/1975 | Zollinger et al. | 214/16.4 |
| 3,878,942 A * | 4/1975 | Hansen et al. | 206/454 |
| 3,883,007 A * | 5/1975 | Hirschboeck | 414/782 |
| 4,032,023 A * | 6/1977 | MacIntosh | 414/267 |
| 4,084,709 A | 4/1978 | Buhrer | 214/1 |
| 4,330,065 A * | 5/1982 | Haddad | 211/70.5 |
| 4,524,680 A * | 6/1985 | Jeanrat et al. | 99/277.1 |
| 5,584,399 A * | 12/1996 | King | 211/41.15 |
| 5,791,852 A * | 8/1998 | Bibby et al. | 414/278 |
| 5,860,539 A * | 1/1999 | Brown | 211/183 |
| 5,899,659 A * | 5/1999 | Beilsmith | 414/796.2 |
| 6,006,676 A * | 12/1999 | Creek et al. | 108/55.3 |
| 6,478,166 B2 * | 11/2002 | Hung | 211/26 |
| 6,516,955 B1 * | 2/2003 | Dudhwala et al. | 211/26 |
| 7,150,361 B2 * | 12/2006 | Calleja | 211/49.1 |
| 7,458,476 B2 * | 12/2008 | Peoples et al. | 211/134 |
| 7,829,838 B2 | 11/2010 | Haubenschild et al. | 250/221 |
| 8,002,128 B2 * | 8/2011 | Kern et al. | 211/194 |
| 2003/0127482 A1 * | 7/2003 | Gort | 224/549 |
| 2003/0185660 A1 * | 10/2003 | Kafka et al. | 414/619 |
| 2006/0011802 A1 * | 1/2006 | Di Cesare | 249/158 |
| 2006/0186072 A1 * | 8/2006 | Naruishi et al. | 211/189 |
| 2008/0006596 A1 * | 1/2008 | Palmeri | 211/189 |
| 2008/0135506 A1 * | 6/2008 | Peters et al. | 211/49.1 |
| 2009/0195384 A1 * | 8/2009 | Amidi | 340/568.1 |
| 2010/0072092 A1 * | 3/2010 | Anscomb et al. | 206/319 |

* cited by examiner

*Primary Examiner* — Gregory Adams
*Assistant Examiner* — Lynn Schwenning
(74) *Attorney, Agent, or Firm* — MacCord Mason PLLC (57) ABSTRACT

A warehouse storage system is shown and described. In one embodiment, the system includes a building, at least one mobile rack and a loader. Typically, the loader is configured to receive a material in a first loading position and orient the material to a second storage position. The loader may include a lift and a carriage. In particular embodiments, the mobile rack includes a load stabilizer system.

53 Claims, 11 Drawing Sheets

WAREHOUSE STORAGE SYSTEM

FIELD

The present disclosure relates generally to storage systems and, more particularly, to an improved warehouse picking and storage system.

BACKGROUND

Warehouses and product displays are used by manufactures, retailers, importers, exporters, wholesalers, transport business and the like and often function as an integral role in a product's commercial chain. Some of the major warehousing processes include receiving product, placement for storage, product display, picking or other order preparation, shipping and inventory management. Often, picking/order preparation includes a selection process where product is picked from one or more unit bundles and handled as partial units.

These partial units may then be cataloged and placed in a secondary container for shipping or delivery. To enhance warehouse efficiency, it is favorable to optimize the picking/order preparation process. Typically, proper warehouse slotting addresses which storage medium product is picked from and which product is picked to fill an order. A proper slotting plan improves warehouse productivity, labor costs and inventory rotation requirements.

Applicants desire a system and method for warehouse storage without the drawbacks presented by traditional storage and display approaches.

SUMMARY

In accordance with the present disclosure, a warehouse storage system is provided to enhance storage efficiency, productivity and labor costs. This disclosure provides an improved system that is convenient, efficient and safe for the operator, particularly when used in a warehouse, such as warehouse picking facility, and other display environments.

Embodiments of the present disclosure provide a warehouse storage system that includes a plurality of mobile racks and a loader. The loader may be adapted to receive a material in a first position and orient the material to a second position. The material may be units of molding, or the like. In some embodiments, the loader is adapted to receive material in a first loading position and orient the material into a second storage position. The loader may include a lift and a carriage that is adjacent to the lift. The carriage may be adjacent to and moveably positioned along the lift.

In other examples, the lift may include a proximate end that is substantially perpendicular to the carriage, for example when the system is in the first loading position. The lift may have a distal end that is substantially parallel to said carriage, for example when the system is in the second storage position. The lift may further include a safety screen.

The lift may include a mover assembly that is adapted to orient the material from the first loading position to the second storage position. In some embodiments, the mover assembly includes at least one fastener, for example fastener chains, bands, ropes or the like, secured to the carriage. The mover assembly may also include a counterbalance weight, and for example, the counterbalance may be secured to at least one of the fasteners. The mover assembly may include at least one axle that is adapted to position the fastener along the lift. The mover assembly may also include a motor. The motor may include a peripheral interface controller. The peripheral interface controller may have at least two frequencies.

The carriage may have a proximate end having a carriage guide that is adapted to guide the carriage along the lift, for example along the vertical axis of the lift. The carriage may also have a distal end that is substantially perpendicular to the lift in the first loading position. The distal end may also include an inclined member that is adapted to retain the mobile rack.

In other examples, the carriage includes a back support. The back support may include at least one hook, and the hook may be adapted to removably secure the mobile rack to the carriage. The carriage may also include at least one wheel. For instance, the carriage may include a pair of wheels, or two pairs of wheels, on the distal end of the carriage. The system may also include a control to moveably position the carriage along the lift, for instance between the first and the second positions.

In other embodiments, the warehouse storage system includes a building, at least one mobile rack and a loader. The loader may be adapted to receive material in a first loading position and then orient the material to a second storage position. The warehouse storage system may include load stabilizing system. The load stabilizer system may include a support block. In other examples, the load stabilizer system includes at least one spacer that is affixed to the mobile rack.

The building may include at least one aisle. In other examples, the building includes at least one storage spot. The storage spot may have a corresponding warehouse identification description. Further, the material may be transported in a same position as the material is stored.

The at least one mobile rack may include a loading face. The loading face may have an upper frame support, a lower frame support and a loading entry. The loading entry may be between the upper frame and the lower frame supports. In other examples, the at least one mobile rack includes at least one eyehook on the upper frame and on the lower frame. In these examples, a tie-down may be secured between the eyehooks, and in some examples, the tie-down may cross over the material above the center of gravity of the mobile rack and/or material. Also, the at least one mobile rack may include an exposed picking face.

In yet other embodiments, a warehouse storage system includes a building, a plurality of mobile racks, a loader and a load stabilizer system within each of the mobile racks. The loader may be adapted to receive material in a first loading position and then orient the material into a second storage position. The material may be transported in a same position in which the material, and/or material units, is stored.

The load stabilizer may include a support block. The load stabilizer may also include at least one spacer affixed to the mobile rack. The building may have at least one aisle. Further, the building may include at least one storage spot. The storage spot may have a corresponding warehouse identification description.

The at least one mobile rack may include a loading face. The loading face may have an upper frame support, a lower frame support and a loading entry between the upper frame and lower frame supports. The at least one mobile rack may also include an eye hook on the upper frame and the lower frame. A tie-down secured between the eye hooks on the upper frame and the lower frame may cross over the material, for example above the center of gravity of the mobile rack and/or the center of gravity of the material or material unit. The at least one mobile rack may include an exposed picking face. Further, the at least one mobile rack may include a base having fork cavities.

The lift may have a proximate end, for example a proximate end that is substantially perpendicular to the carriage in the first loading position. The lift may also have a distal end that is substantially parallel to the carriage, for example in the second storage position. The lift may also include a safety screen.

The warehouse storage system may also include a mover assembly that is adapted to orient the material from the first loading position to the second storage position. The mover assembly may include at least one fastener, i.e. a chain or the like, secured to the carriage. The mover assembly may include a counterbalance weight that is secured to the fastener. Further, the mover assembly may include at least one axle that is adapted to position the fastener along the lift.

The mover assembly may also include a motor. The motor may include a peripheral interface controller. The peripheral interface controller may have at least two frequencies.

The carriage may have a proximate end that has a carriage guide that is adapted to guide the carriage along the lift. Also, the carriage may include a distal end that is substantially perpendicular to the lift, for example in the first loading position. The distal end may include an inclined member adapted to retain the mobile rack. The carriage may have a back support.

The carriage may also include at least one hook on the backing support face. The hook may be adapted to removably secure the mobile rack to the carriage. Further, the carriage may include a wheel. The warehouse storage system may also include a control to moveably position the carriage along the lift.

The above summary was intended to summarize certain embodiments of the present disclosure. Embodiments will be set forth in more detail in the figures and description of embodiments below. It will be apparent, however, that the description of embodiments is not intended to limit the present inventions, the scope of which should be properly determined by the appended claims.

BRIEF DESCRIPTION OF THE DRAWINGS

Embodiments of the disclosure will be better understood by a reading of the Description of Embodiments along with a review of the drawings, in which.

DESCRIPTION OF EMBODIMENTS

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Figure 1:
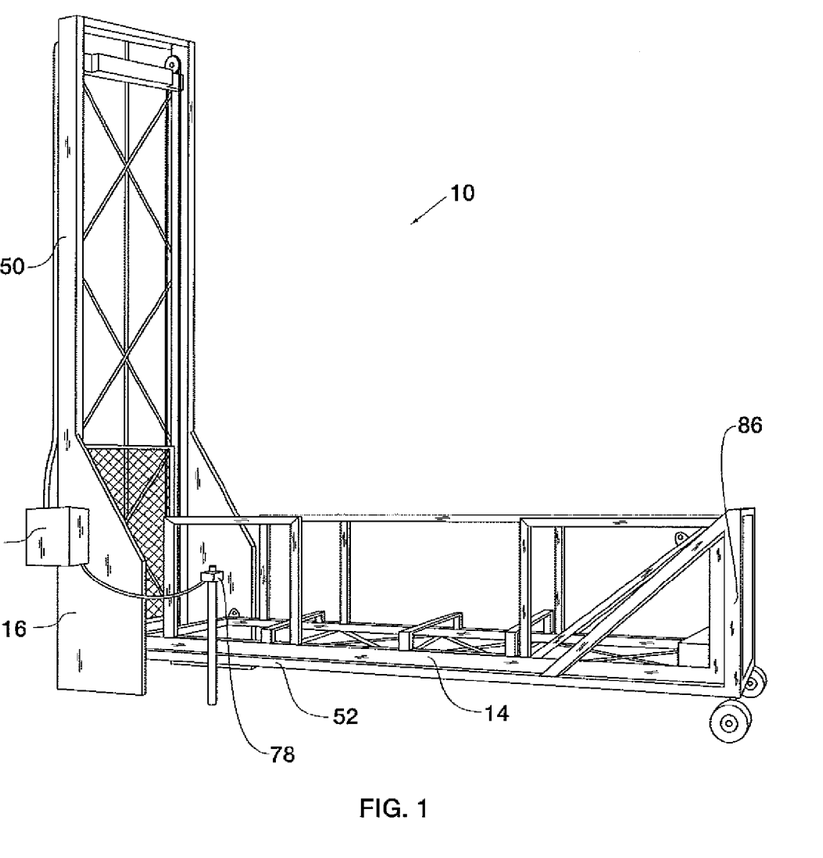
FIG. 1 is a side perspective view of a warehouse storage system according to an embodiment of the disclosure.

Referring now to the drawings in general and FIG. 1 in particular, it will be understood that the illustrations are for the purpose of describing embodiments of the disclosure and are not intended to limit the disclosure or any inventions thereto. As best seen in FIG. 1, a warehouse storage system 10 is shown embodied according to the present disclosure. Warehouse storage system 10 includes at least one mobile rack 14 and a loader 16. The loader may include a lift 50 and a carriage 52 that is secured to lift 50 and movably repositionable along lift 50. Typically, loader 16 includes a mover assembly to power such movement. Further, mobile racks 14 are typically adapted to fit within the exoskeleton of carriage 52 for material loading and to be repositioned to a general second storage position within loader 16. Rack 14 is then removable from loader 16 and may be stored at a second location in a warehouse or other picking/display facility.

Figure 2:
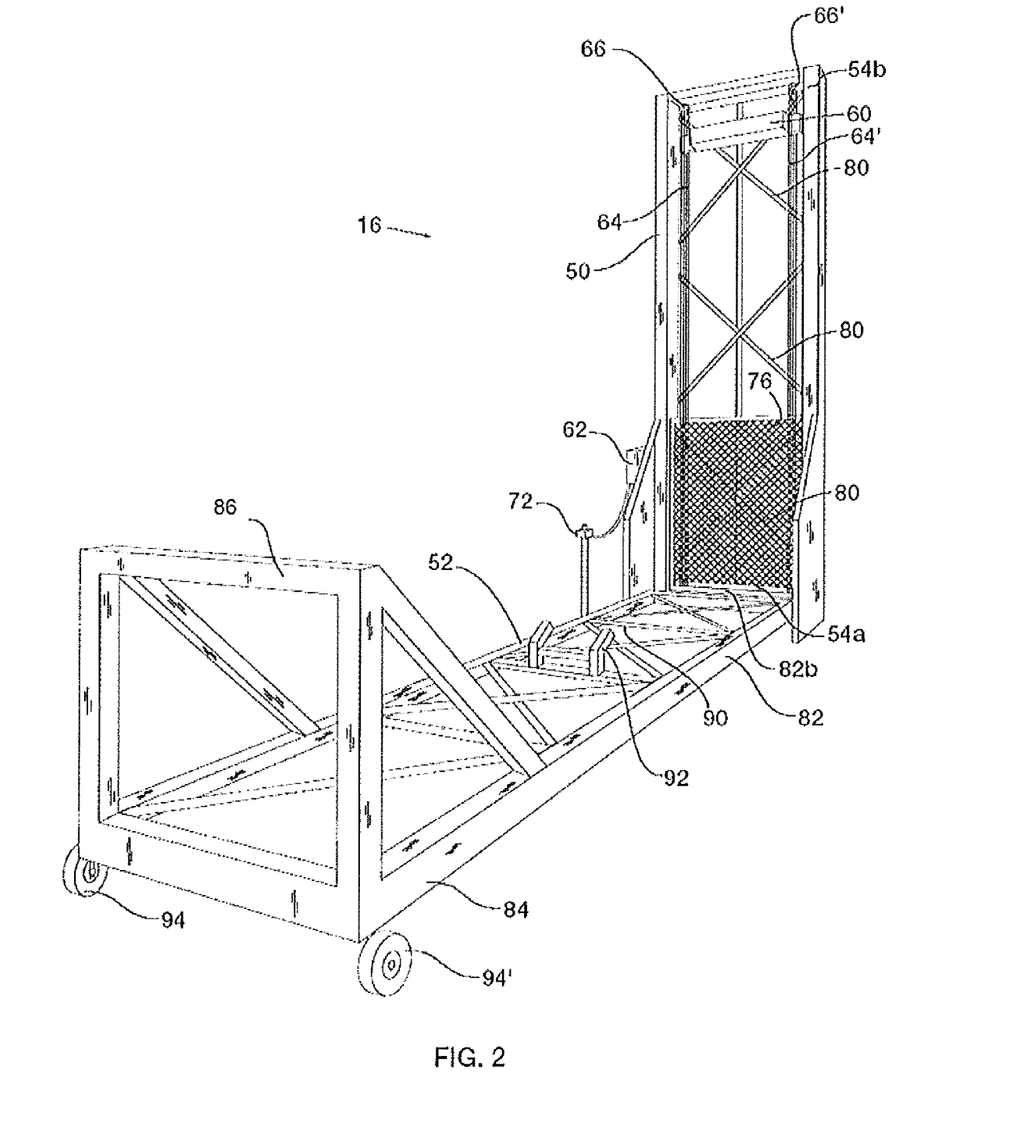
FIG. 2 is a front perspective view of a loader introduced in the embodiment of FIG. 1.

FIG. 2 illustrates lift 50 and carriage 52 of loader 16 that are introduced in the embodiment of FIG. 1. As shown, lift 50 has a proximate end 54$a$ that is adjacent to carriage 52, and a distal end 54$b$ that is generally fixed in a defined position, for instance in a substantially perpendicular position in relation to the floor, for instance a warehouse floor. However, those of ordinary skill will recognize that the geometric relationship between carriage's 52 movement along lift 50 may vary depending on material loading procedures, as discussed hereinafter, and/or sufficient clearance demands.

Lift 50 is substantially sturdy to support the load of carriage 52, and in particular, a load when carriage 52 is supporting a fully loaded rack 14 of material. As illustrated in FIG. 2, lift 50 may include a pair of support columns and a plurality of crossbars 80. In other embodiments, a safety screen 76 and/or protective flanges on lift 50 may help protect materials and handlers during operation of the system 10. Typically, the lift's 50 proximate end 54$a$ receives carriage 52 at carriage guide 82$b$, so as to allow rotational pivoting and vertical up and down movement of carriage 52 about lift 50. FIG. 2 shows one engagement of carriage 52 and lift 50 in a general first loading position, wherein carriage 52 is substantially perpendicular to lift 50. Other embodiments of the first loading position include carriage 52 and lift 50 in a variety of geometric angles so as to accommodate material/loading clearance restraints.

Lift 50 includes a mover assembly to reposition the proximate end 82 of carriage 52 along the lift, for example along the lift's vertical axis as indicated in FIG. 2. In particular embodiments, a pair of elongated fastener chains 64,64', or the like, have at least one end attached to carriage 52 and powered by a motor 62, for example an electronic drive motor, a hydraulic, pneumatic or the like motor. Fastener chains 64, 64' may be held in position and oriented along the length of lift 50 with axles 66, 66' or other similar winding wheels. Further, in particular examples of the mover assembly, a counterbalance 60 may be secured to fastener chains 64, 64'. As shown, counterbalance 60 provides additional stability for system 10 as the mover assembly repositions carriage 52 about lift 50.

Mover assembly may include a peripheral interface controller. In some embodiments, the peripheral interface controller provides at least two frequencies that represent an instruction queue of the motor's 62 speed output. For illustrative purposes only, a first frequency may designate power in response to a first state speed of carriage's 52 movement along the lower section of the lift's vertical axis as it moves away from the proximate end 54a. A second frequency may re-designate power in response to a slower second state speed of carriage 52, for instance as carriage 52 begins its ascent and as carriage 52 approaches the top distal end 54b of the lift's upper section to slow movement of carriage 52 to reduce, or eliminate, carriage 52 and/or material recoil or banging.

In some examples, motor 62 may be powered by about a three horsepower engine. In such examples, when lift's 50 lifting mechanism is engaged, motor 62 may receive about thirty hertz as carriage 52 begins its ascension away from its loading position. Then, mechanical switches may be activated to adjust the input to sixty hertz as carriage 52 moves along the path of the lift's 50 vertical axis. Finally, the mechanical switches may then re-designate motor 62 to receive only thirty hertz as carriage 52 approaches the upper section of lift 50, for instance the top distal end 54b. Motor 62 may similarly receive a mirrored scheduled hertz pattern during the decent of carriage 52 along lift 50 as described in the ascent herein. Other embodiments include the motor receiving a variety of scheduled inputs from the engine to accommodate a variety of loader weights, material loads, and other clearance and loading constraints.

The operation of the mover assembly, for example via the drive motor 62, may be controlled by an electronic control 72 such that an operator can operate the mover assembly. For instance, the operator may control the winding of the fasteners 64,64' to manipulate the position of carriage 52 about lift 50 and/or the speed frequencies of the mover assembly with electronic controls 72. In yet other examples, electronic control 72 may be wireless to allow an operator to remotely control the operation of the mover assembly.

Figure 3:
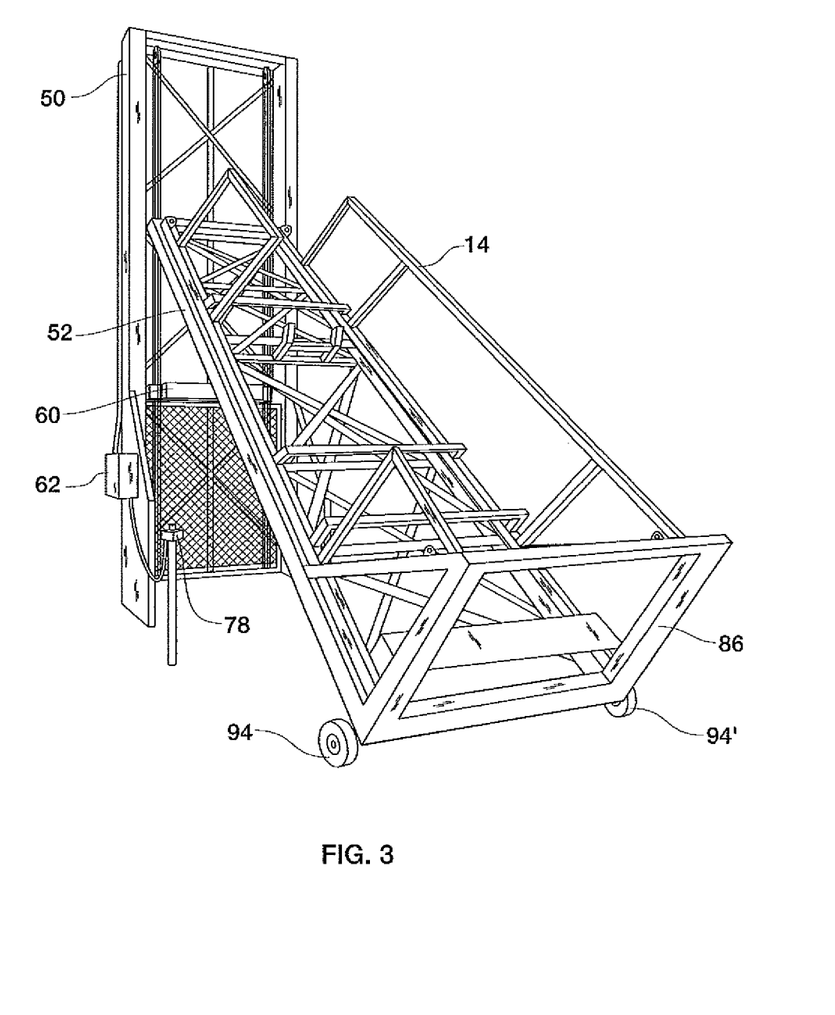
FIG. 3 is a front perspective view of the warehouse storage system of FIG. 1 while being raised to a substantially vertical position without material.
Figure 4:
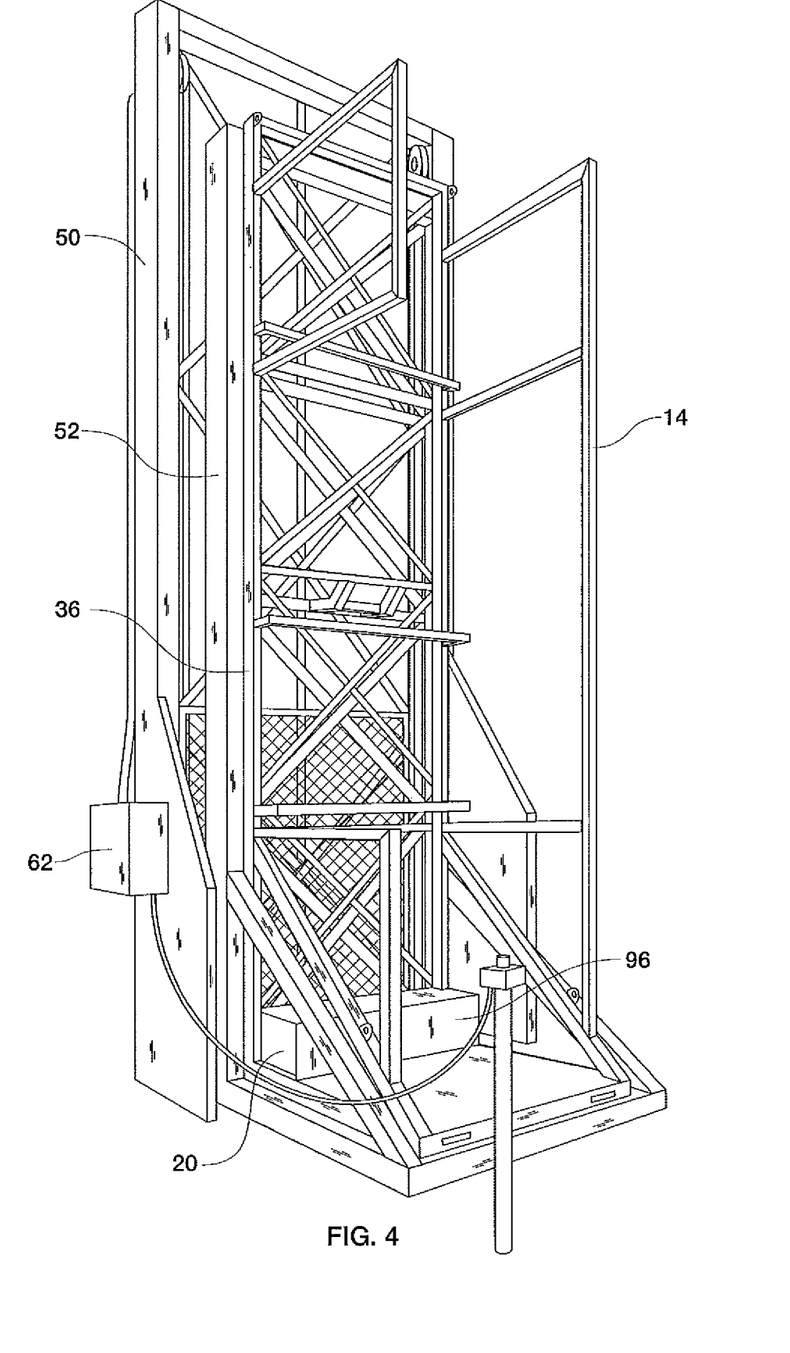
FIG. 4 is a side perspective view of the warehouse storage system of FIG. 1 positioned in a substantially vertical position without material.

As illustrated in FIG. 2, the proximate end 82 of carriage 52 includes a carriage guide 82b to generally guide the carriage along the lift. The opposing distal end 84 of carriage 52 includes at least one wheel 94, 94', including four wheels (not shown). Typically, wheels 94, 94' help support and pivot carriage 52 along the warehouse surface as carriage 52 is repositioned along the vertical axis of lift 50, as seen in FIG. 3, into a second storage position as illustrated in FIG. 4. As seen in FIG. 4, carriage 52 is substantially parallel with lift 50 in one embodiment of the second storage position. Other embodiments of the second storage position include other geometric relationships between the carriage 52 and lift 50 to meet material handling/picking constraints.

Returning to FIG. 2, carriage 52 may have a back support surface 90 to generally support and maintain material 300, including molding units, in a defined position during loading, repositioning and picking/storage. In some examples, back support surface 90 includes at least one hook 92, including a pair of hooks, which removably secure a mobile rack 14 to carriage 52. Further, the distal end 84 of the carriage may include a substantially inclined member 86 to support and axially secure mobile rack 14 and material during the carriage's movement along the lift's vertical axis.

As introduced above, FIG. 3 shows one embodiment of carriage 52 being moved along lift 50. As shown, motor 62 is powering fasteners 64,64' of mover assembly to reposition the vertical height of carriage 52 with respect to lift 50, and in particular along lift's 50 vertical axis.

FIG. 4 shows one embodiment of the warehouse storage system 10 in a second storage position without material. In this example of rack 14, which is vertically positioned in the second storage position, carriage 52 is supported on its bottom by lift 50 and on its back support by lift 50. Typically, rack 14 is positioned in the second storage position so that the front face of rack 14 is accessible to be engaged by a forklift, or the like.

Figure 5A:
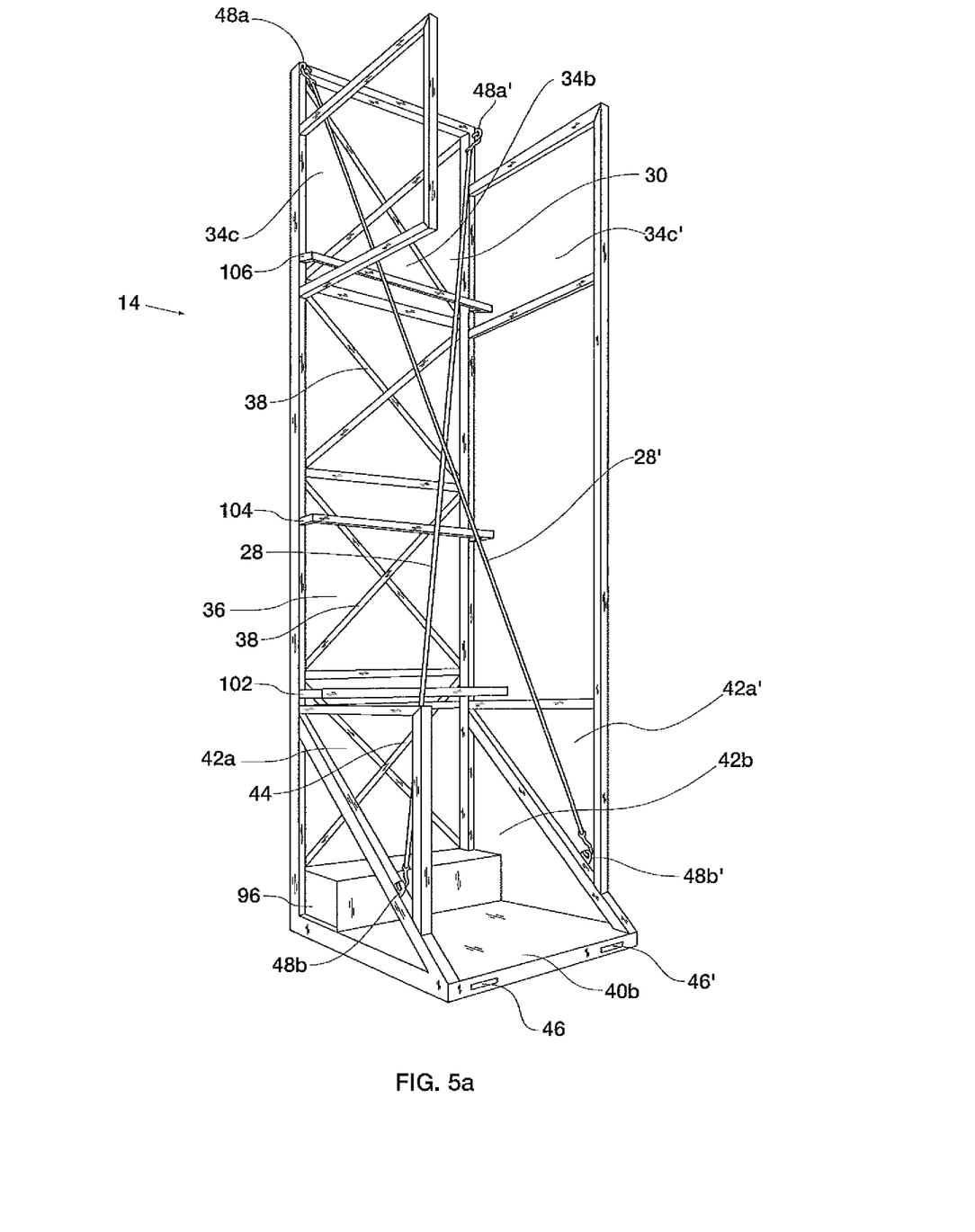
FIG. 5A is a front perspective view of a mobile rack introduced in the embodiment of FIG. 1 in one vertical storage position.

FIG. 5A illustrates an isolated mobile rack 14 in a vertical storage position capable of being conveniently transported and stored, even while loaded with material. Rack 14 may be constructed in a variety of structural shapes of steel or other metal stock material, and may be advantageously balanced in an anti-tip arrangement as discussed hereinafter to provide stability during loading, transport and storage. Rack 14 is sufficiently sturdy to be transported by a forklift, or the like, and be otherwise manipulated by loader 16. For instance, in particular embodiments, rack 14 may support loads greater than about seven thousand pounds. However, other embodiments of rack 14 may support loads of both greater than and less than seven thousand pounds, depending on the particular material.

Figure 5B:
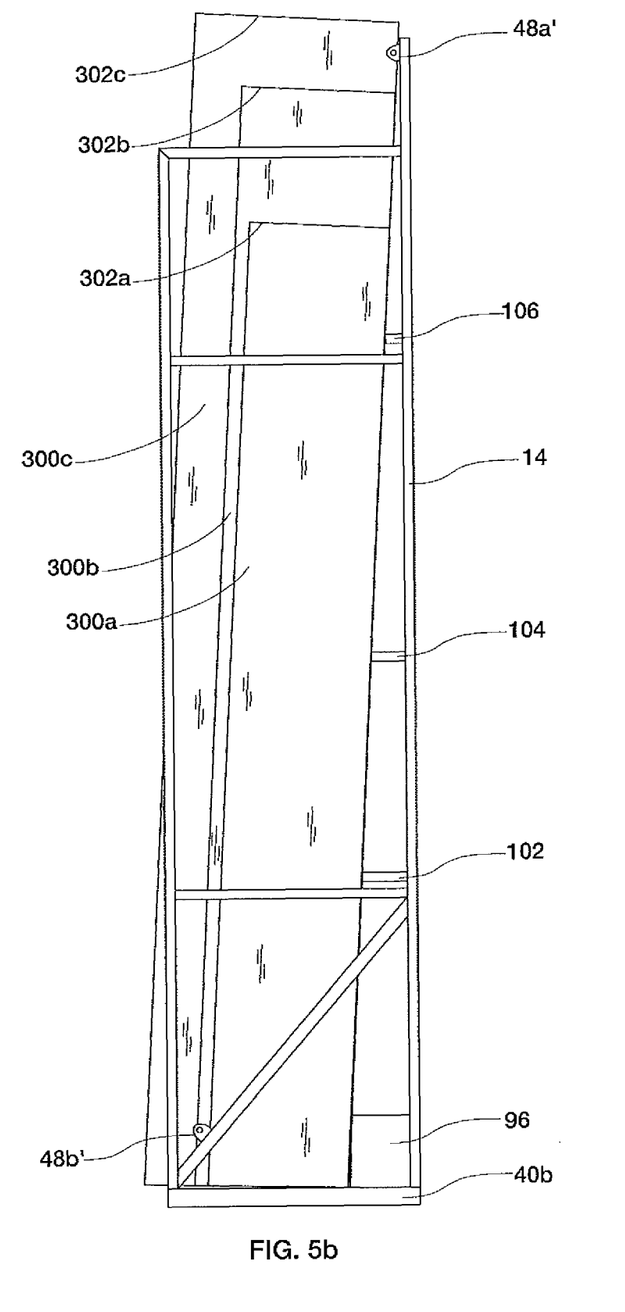
FIG. 5B is a side perspective view of a mobile rack introduced in the embodiment of FIG. 1, highlighting three sizes of material that may be secured in the rack in a storage position.

Certain examples of rack 14 are in the form of a substantially rectangular cage, as illustrated in FIGS. 5A and 5B, and include an upper frame 30 and a lower frame 44. For instance, the base of rack 14 may span about forty-four inches from the backside to the front side, and span about forty-nine inches from the left side to the right side. In particular embodiments, the base includes about thirty-two inches to accept and store materials, and molding units in particular. Typically, embodiments of the rack include six faces, including closed support faces, a loading entry access face and at least one picking face.

Rack's 14 closed support faces may support and maintain material in a secure position during movement, storage and picking. As seen in FIGS. 5A and 5B, upper frame 30 includes a backing support defined by the two vertical corner posts and plurality of cross members 38. Upper frame 30 also includes opposing upper frame side faces 34c, 34c'. Similarly, lower frame 44 includes a backing support defined by the two vertical corner posts and plurality of cross members 38, as well as lower frame side faces 42a, 42a'. As shown, the backing support and the side faces may comprise a framed planar support network; however, other embodiments include solid surfaces.

Figure 6:
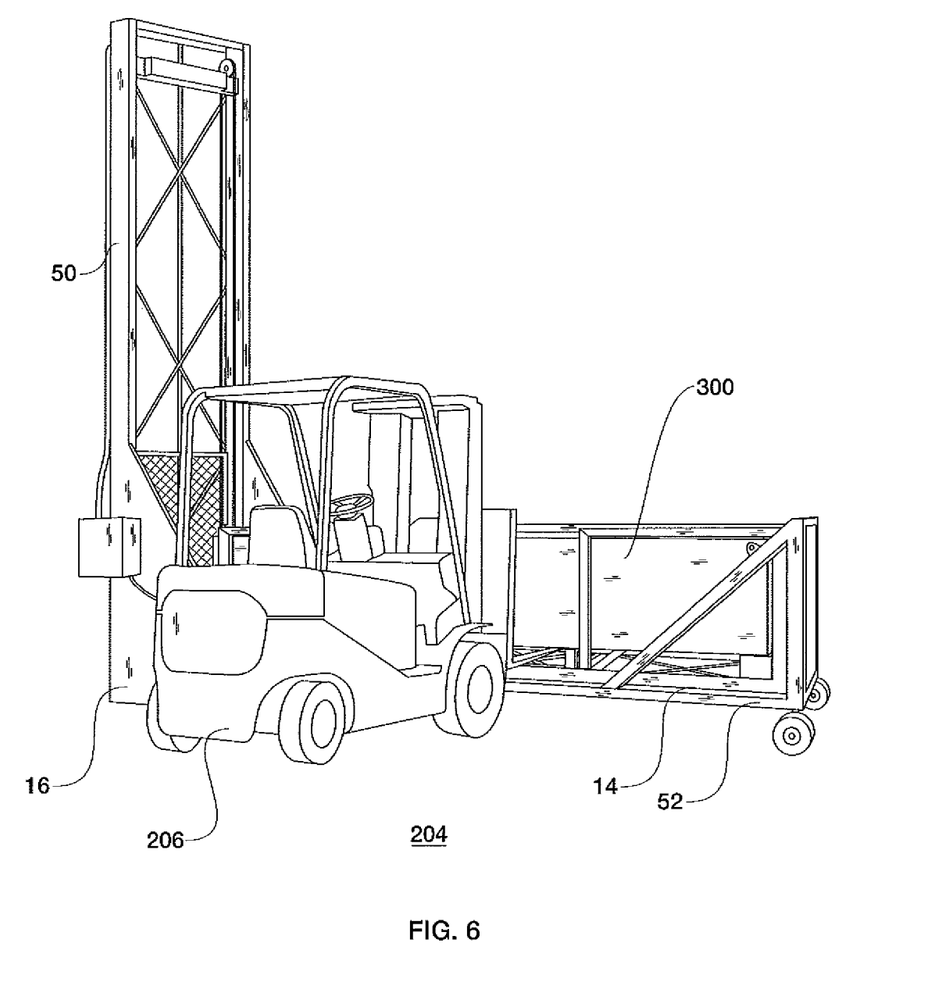
FIG. 6 is a side perspective view of a warehouse storage system according to an embodiment of the disclosure in one loading position, where material is being positioned in the loader.

A loading entry access on rack 14 allows a forklift, or similar machinery, and operator access to the cavity of rack 14 during loading/unloading of material. As shown in the embodiment of FIGS. 5A and 6, loading entry access 36 is defined by a side opening between upper frame 30 and lower frame 44. FIG. 6 shows forklift 206 positioning material 300 in the rack 14 through the loading entry access. Other embodiments include the loading entry access to be on an opposing side to allow for clearance and/or material loading constraints.

Further, rack 14 includes at least one picking face exposing material 300 in rack 14 to picking/material handling. As shown in FIG. 5A, the picking face may extend along the front axis of rack 14 to allow for picking of axially-oriented material in rack 14. In particular embodiments, upper frame 30 includes an upper picking face 34b and lower frame 44 includes lower picking face 42b.

As shown in FIG. 5A, the top surface of rack 14, i.e. the top of upper frame 30, is open to allow particular material to exceed the height of rack 14. FIG. 5B illustrates a plurality of material heights, 300a-c representing molding units of about fourteen feet, molding units of about sixteen feet and molding units of about seventeen feet, all capable of being stored, secured and conveniently balanced under the load stabilizing system of rack 14. Other embodiments of the racks are sized to accept and secure materials with a variety of height and width dimensions.

As illustrated, the bottom face of rack 14, i.e. the bottom of lower frame 44, includes a rigid base 40b which is generally arranged to be engaged by the forks of a forklift, or the like, for transport from location to location. Base 40b may be formed by a plurality of structural channels and plates suitably welded together to provide structural support for a common platform to receive one end of the material. The channels may be fabricated from tubular stock, for example constructed of standard nominal diameter pipe. Typically, the platform of base 40b is sized to receive a unit of material, for example a unit of molding. As shown in FIG. 5A, the surface perpendicular to platform includes fork cavity cross ribs 46.

In particular examples, the channels of fork cavity cross ribs 46 are fabricated from tubular stock, for example constructed of standard nominal inner diameter pipe, to accommodate standard forks of lift trucks with adequate spacing and stability. For example, the height of fork cavity 46 is sufficient to afford easy entry of the forks of lift trucks. The mobility of rack 14 is advantageous to permit the rack to be loaded at a designated point remote from where it is to be stored or displayed.

Rack 14 may also feature a load stabilizing system to allow rack 14 to combat the unsafe and damaging tendency of vertical material to lean, sag or even fall, during loading, storage, unloading, and in particular, during the transporting of the materials. In some embodiments, load stabilizing system 20 includes a stabilizer block and at least one load stabilizer spacer that extends substantially perpendicular from the backing support of rack 14.

As shown in FIG. 5A, stabilizer block 96 is typically affixed to base 40b. Further, as shown in FIG. 5B the backing support of rack 14 may include a plurality of height-scheduled load stabilizer spacers 102, 104 and 106 to compliment the inclined pitch of material, for instance the inclined pitch of molding and/or molding units. Typically, load stabilizer spacer 102 is positioned along lower frame 44 and is greater in length than load stabilizer spacer 104, which is found in the middle of the height of rack 14. Finally, load stabilizer spacer 106 may be affixed to upper frame 30 and is typically shorter in length than any of the preceding load stabilizer spacers. The overall scheduled height of the load stabilizer spacers provides a predefined incline plane, starting at stabilizer block 96, to support materials 300 during loading, relocation and storage. Other embodiments include load stabilizer spacers having a variety of lengths affixed at other predetermined locations to match the inclined pitch of material, and molding material in particular.

As shown in FIG. 5A, stabilizer block 96 is sized and positioned along the backing support edge on base 40b. Typically, stabilizer block 96 initiates a defined angled pitch against the base for materials to become positioned within the rack. Other embodiments include a plurality of stabilizer blocks positioned along base 40b.

Figure 7:
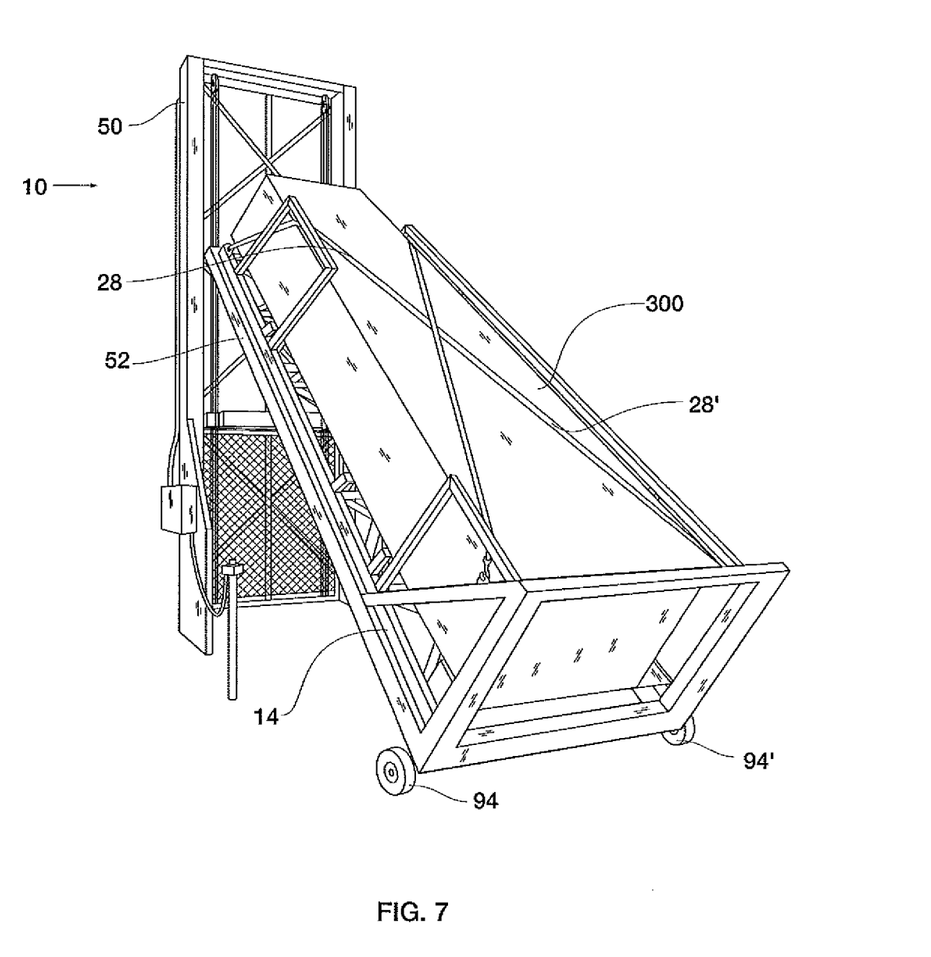
FIG. 7 is a front perspective view of the warehouse storage system of FIG. 6 with material while being raised to a substantially vertical position.
Figure 8:
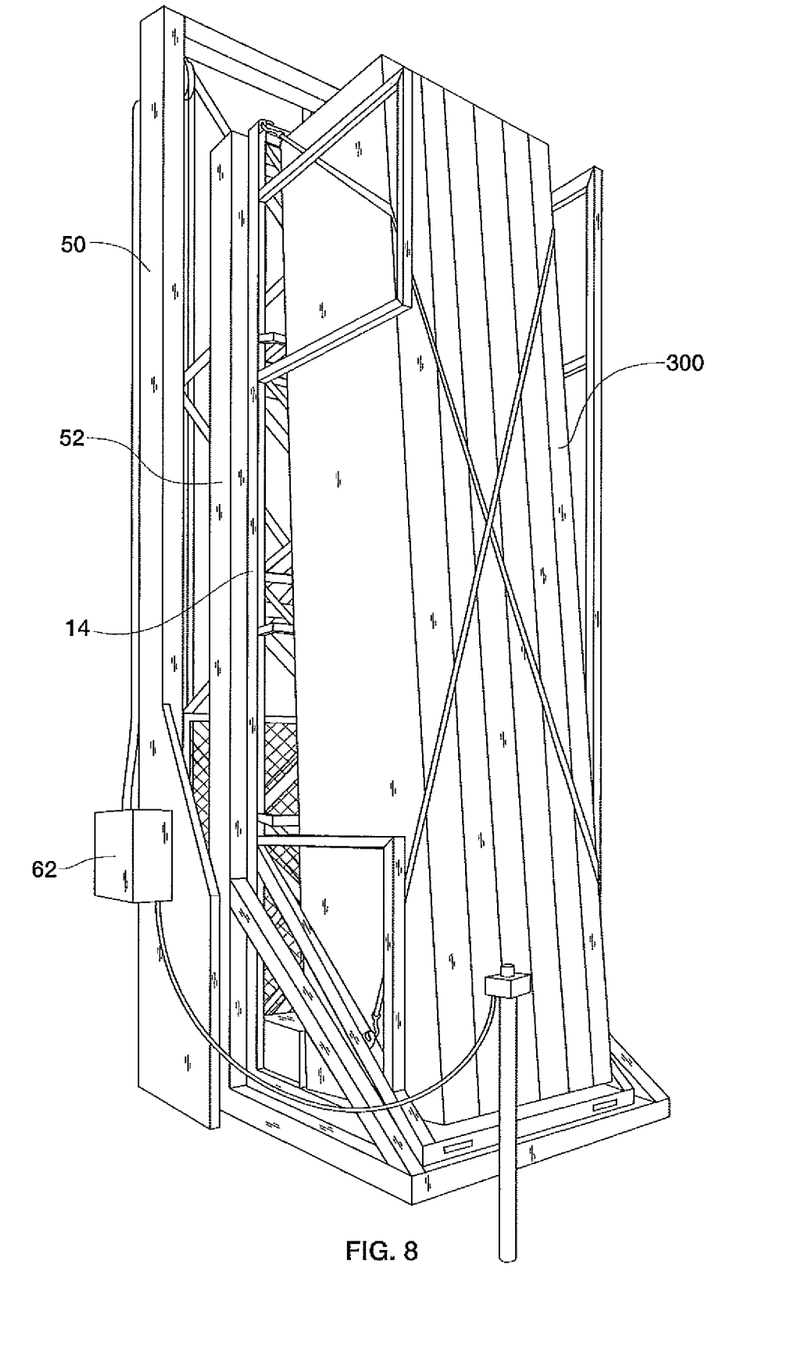
FIG. 8 is a side perspective view of the warehouse storage system of FIG. 7 positioned in a substantially vertical position.

Rack 14 further includes predetermined tie-down locations to secure materials during relocation, storage, and optionally, during picking. In particular embodiments, tie downs may be secured along rack 14 so that the tie-downs cross material above the material's center of gravity. As shown in FIG. 5A, one embodiment includes opposing upper eye hooks 48a, 48a' secured to upper frame 30, and opposing lower eye hooks 48b, 48b' secured to lower frame 44. Tie-downs 28, 28' may be secured between the tie-down locations. For example, as shown in FIGS. 5A, 7 and 8, the tie-downs 28, 28' secured between upper eye hooks 48a, 48a' and lower eye hooks 48b, 48b' may cross over material 300.

In particular embodiments, tie-downs 28, 28' secured between upper eye hooks 48a, 48a' and lower eye hooks 48b, 48b' cross over material 300 above the centroid of loaded rack 14. Other embodiments include eye hooks, or similar securing devices, affixed on other locations of rack 14, including, for illustrative purposes only, eyehooks being positioned on the upper frame to generally reposition the location of where tie-downs cross over material 300.

Rack 14 may also include a label plate to designate a particular storage use or function in the storage system. Typically, the label plate is accessible and/or readable from the front face of rack 14; however, other embodiments include a label plate on a different face, or multiple label plates on multiple faces of rack 14.

In operation, warehouse storage system 10 provides for convenient, safe material loading, relocation and storage. In one embodiment, a starting first loading position includes an empty rack 14 positioned within carriage 52 of loader 16, as indicated in FIG. 1. Next, FIG. 6 shows forklift 206, or similar mechanical device or human effort, selecting a material 300 and placing the material into rack 14 through the loading face 36. Tie-downs 28, 28' may then be secured between upper eye hooks 48a, 48a' and lower eye hooks 48b, 48b', and for example may cross above the center of gravity of material 300 to secure the material to rack 14.

Figure 9:
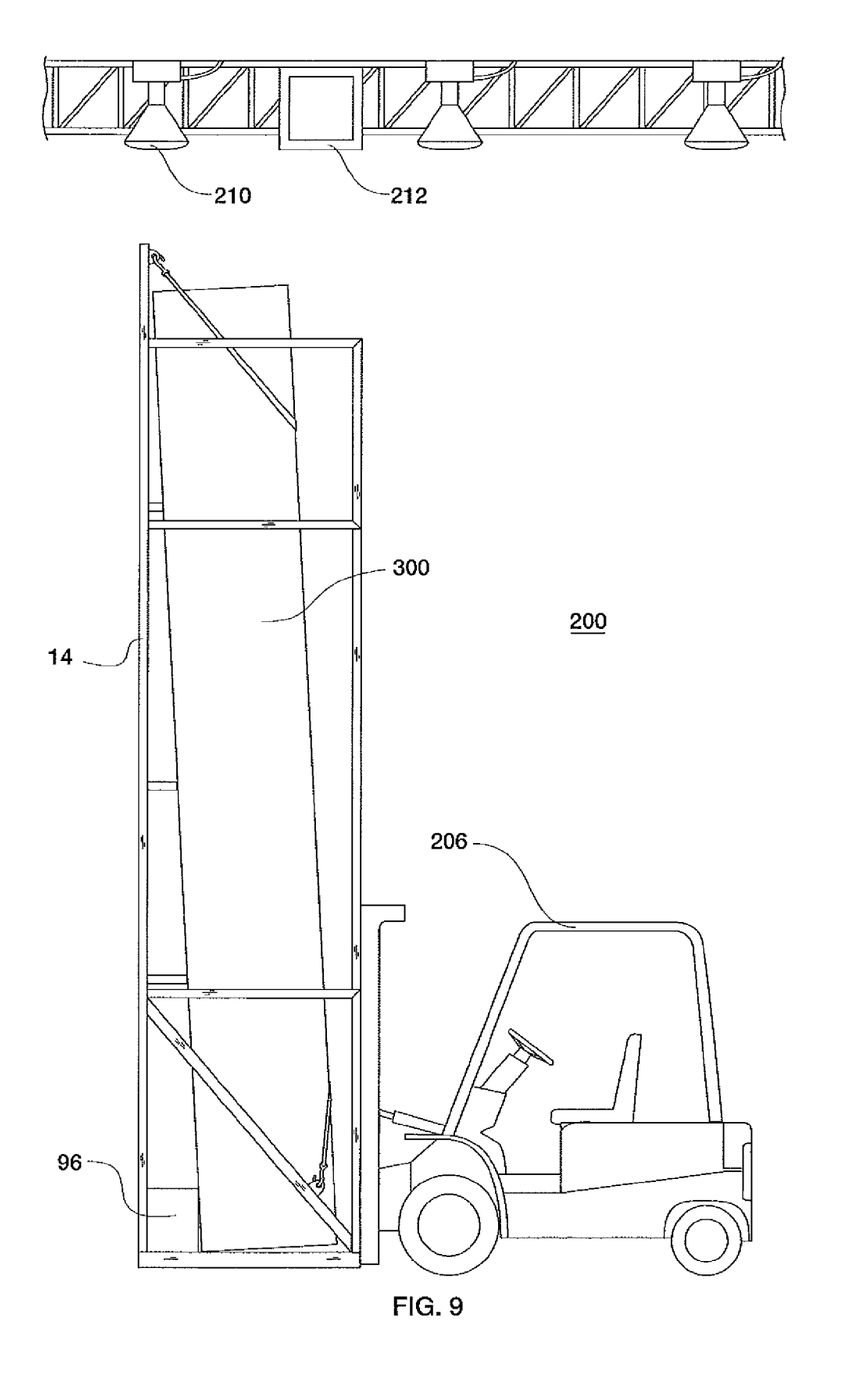
FIG. 9 is a side perspective view of the mobile rack of FIG. 8 loaded with material being transported in a substantially vertical position.

Next, as indicated in FIG. 7, the mover assembly repositions carriage 52 along lift 5, while carriage wheels 94 wheel carriage 52 towards lift 50. FIG. 8 illustrates one embodiment of the second storage position, wherein loaded carriage 52 is substantially parallel with lift 50. Forklift 206 may then engage rack 14 and remove the rack from carriage 52, as shown in FIG. 9. FIG. 9 also illustrates the lighting 210, HVAC unit 212 of warehouse 200. Finally, forklift 206 may relocate loaded rack 14, which may be loaded with material 300, to another location in warehouse 200.

Figure 10:
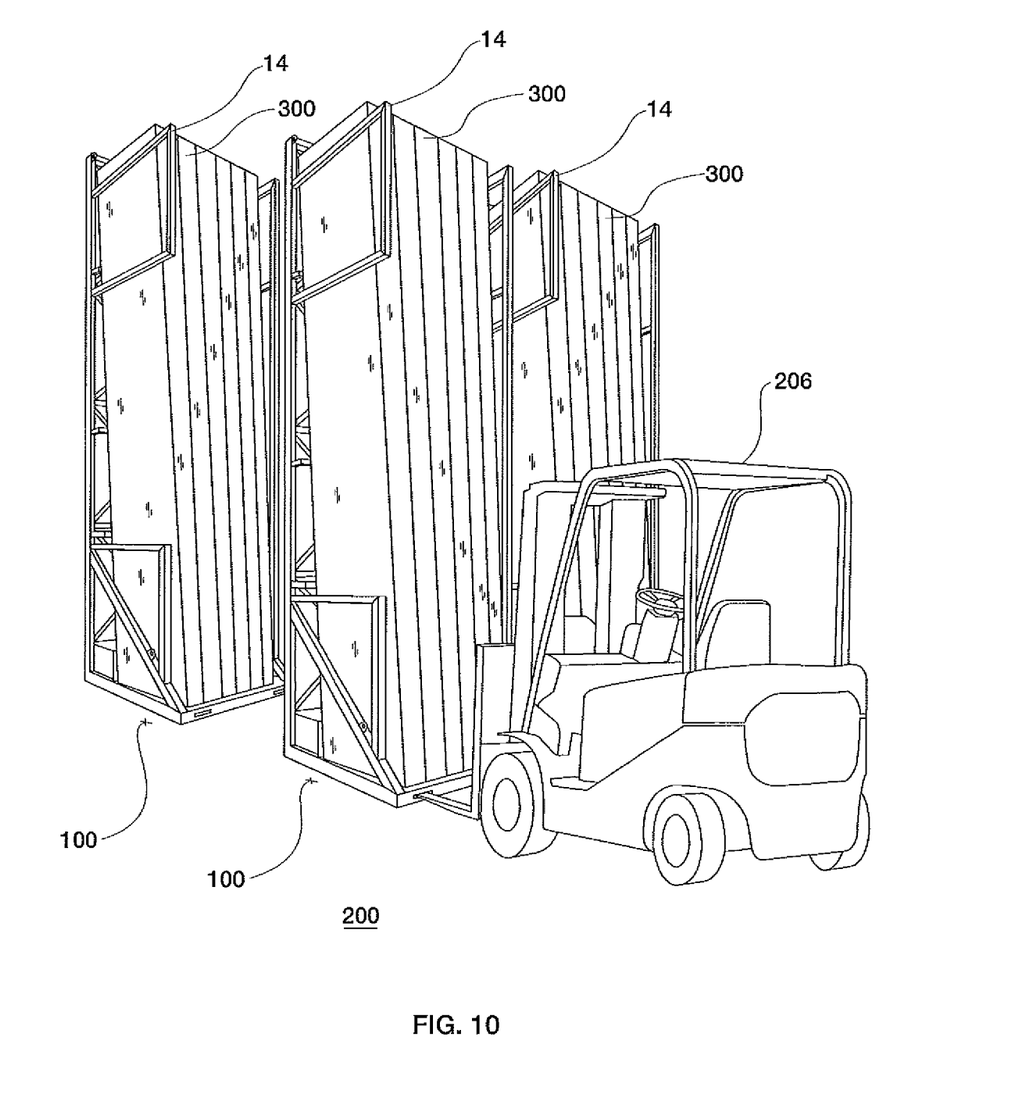
FIG. 10 a side perspective view of a warehouse storage system that includes mobile racks loaded with material being stored in warehouse aisles.

As shown in FIG. 10, racks 14 are moveable along a warehouse building 200, or similar storage or display setting, and may selectively form an aisle 22 between adjacent racks 14. Typically, the mobile racks 14 are spaced from one another in a manner to form relatively wide aisles to allow sufficient room for the forklift 206, or similar work vehicle, to access a particular warehouse storage spots 24. In particular embodiments, a corresponding warehouse identification description may designate a particular storage spot 24 to allow an operator to identify the rack 14, and/or aisles 22, containing a desired picking or loading point.

While in some configurations each aisle 22 includes a single row of racks 14, other embodiments include racks 14 in at least back-to-back orientations to enhance the picking/order preparation process. To access a rearward rack given the back-to-back configuration, the first rack is removed such that the rear rack may be accessible. Thus, mobile rack configurations provide enhanced efficiency and organization, particularly during the picking/order preparation processes.

Numerous characteristics and advantages have been set forth in the foregoing description, together with details of structure and function. Many of the novel features are pointed out in the appended claims. The disclosure, however, is illustrative only, and changes may be made in detail, especially in matters of shape, size and arrangement of parts, within the principle of the disclosure, to the full extent indicated by the broad general meaning of the terms in which the general claims are expressed. It is further noted that, as used in this application, the singular forms "a," "an," and "the" include plural referents unless expressly and unequivocally limited to one referent.

We claim:

1. A warehouse storage system comprising:
   (a) a building;
   (b) a loader adapted to receive material in a first loading position and orient said material to a second storage position; and
   (c) at least one mobile rack removably positioned within said loader, said mobile rack including:
      (i) an upper frame and a lower frame, and wherein a side loading entry is unobstructed between said upper frame and said lower frame,
      (ii) a front picking opening substantially perpendicular to said loading entry, and
      (iii) a base having a load stabilizing system, said load stabilizing system including a stabilizer block positioned along a back edge of said base and extending substantially forward of said rear of said rack and a stabilizer spacer protruding from said rear of said rack, whereby contact between said material and said stabilizing block causes said material to pitch rearward opposite the front picking opening.

2. The warehouse storage system according to claim 1, wherein said material may be transported in a same position as stored.

3. The warehouse storage system according to claim 1, wherein said load stabilizer includes at least two spacers affixed to said mobile rack.

4. The warehouse storage system according to claim 1, wherein said building includes at least one aisle.

5. The warehouse storage system according to claim 1, wherein said building includes at least one storage spot.

6. The warehouse storage system according to claim 5, wherein said storage spot includes a corresponding warehouse identification description.

7. The warehouse storage system according to claim 1, wherein said loading entry is positioned between an upper frame support and a lower frame support.

8. The warehouse storage system according to claim 7, wherein said at least one mobile rack includes at least one eye hook on said upper frame and on said lower frame, whereby a tie-down secured between said eye hooks cross over said material above the center of gravity of said mobile rack.

9. The warehouse storage system according to claim 1, wherein said at least one mobile rack includes a base having fork cavities.

10. In a warehouse storage system having a plurality of mobile racks and a loader adapted to receive a material in a first loading position and orient said material to a second storage position, said system comprising:
    (a) a loader including:
       (i) a lift; and
       (ii) a carriage adjacent to and moveably positioned along said lift, said carriage including a back support, wherein a proximate end of said back support is pivotally secured to said lift and a distal end of said back support having a substantially perpendicular base; and
    (b) at least one mobile rack including:
       (i) an upper frame and a lower frame, and wherein a side loading entry is unobstructed between said upper frame and said lower frame,
       (ii) a front picking opening substantially perpendicular to said loading entry, and
       (iii) a base having a load stabilizing system, said load stabilizing system including a stabilizer block positioned along a back edge of said base and extending substantially forward of said rear of said rack and a stabilizer spacer protruding from said rear of said rack.

11. The apparatus according to claim 10, wherein said lift includes a proximate end substantially perpendicular to said carriage in said first loading position.

12. The apparatus according to claim 10, wherein said lift includes a distal end substantially parallel to said carriage in said second storage position.

13. The apparatus according to claim 10, wherein said lift further includes a safety screen.

14. The apparatus according to claim 10 further including a mover assembly adapted to orient said material from said first loading position to said second storage position.

15. The apparatus according to claim 14, wherein said mover assembly includes at least one fastener secured to said carriage.

16. The apparatus according to claim 15, wherein said mover assembly includes a counterbalance weight secured to said at least one fastener.

17. The apparatus according to claim 16, wherein said mover assembly includes at least one axle adapted to position said fastener along said lift.

18. The apparatus according to claim 14, wherein said mover assembly includes a motor.

19. The apparatus according to claim 18, wherein said motor includes a peripheral interface controller.

20. The apparatus according to claim 19, wherein said peripheral interface controller includes at least two frequencies.

21. The apparatus according to claim 10, wherein said carriage includes a proximate end having a carriage guide adapted to guide said carriage along said lift.

22. The apparatus according to claim 10, wherein said carriage includes a distal end substantially perpendicular to said lift in said first loading position.

23. The apparatus according to claim 22, wherein said perpendicular base is adapted to retain said mobile rack.

24. The apparatus according to claim 10, wherein said carriage includes at least one hook on said back support adapted to removably receive and secure said mobile rack to said carriage.

25. The apparatus according to claim 10, wherein said carriage includes a wheel.

26. The apparatus according to claim 10 further including a control to moveably position said carriage along said lift.

27. A warehouse storage system comprising:
    (a) a building;
    (b) a plurality of mobile racks, said mobile racks including:
       (i) an upper frame and a lower frame, and wherein a side loading entry is unobstructed between said upper frame and said lower frame,
       (ii) a front picking opening substantially perpendicular to said loading entry, and
       (iii) a base;
    (c) a loader including a lift and a carriage, wherein said loader is adapted to receive material in a first loading position and orient said material to a second storage position; and (d) a load stabilizer system within at least one of said plurality of mobile racks, said load stabilizer system including a stabilizer block positioned along a back edge of said base and extending substantially forward of said rear of said rack and a stabilizer spacer protruding from said rear of said rack.

28. The warehouse storage system according to claim 27, wherein said material may be transported in a same position as stored.

29. The warehouse storage system according to claim 27, wherein said support block is adapted to pitch materials rearward to said rear of said rack.

30. The warehouse storage system according to claim 27, wherein said load stabilizer includes at least two spacers affixed to said mobile rack.

31. The warehouse storage system according to claim 27, wherein said building includes at least one aisle.

32. The warehouse storage system according to claim 27, wherein said building includes at least one storage spot.

33. The warehouse storage system according to claim 32, wherein said storage spot includes a corresponding warehouse identification description.

34. The warehouse storage system according to claim 27, wherein said loading entry is positioned between an upper frame support and a lower frame support.

35. The warehouse storage system according to claim 34, wherein said at least one mobile rack includes at least one eye hook on said upper frame and on said lower frame, whereby a tie-down secured between said eye hooks cross over said material above the center of gravity of said mobile rack.

36. The warehouse storage system according to claim 27, wherein said at least one mobile rack includes a base having fork cavities.

37. The warehouse storage system according to claim 27, wherein said lift includes a proximate end substantially perpendicular to said carriage in said first loading position.

38. The warehouse storage system according to claim 27, wherein said lift includes a distal end substantially parallel to said carriage in said second storage position.

39. The warehouse storage system according to claim 27, wherein said lift further includes a safety screen.

40. The warehouse storage system according to claim 27 including a mover assembly adapted to orient said material from said first loading position to said second storage position.

41. The warehouse storage system according to claim 40, wherein said mover assembly includes at least one fastener secured to said carriage.

42. The warehouse storage system according to claim 41, wherein said mover assembly includes a counterbalance weight secured to said at least one fastener.

43. The warehouse storage system according to claim 42, wherein said mover assembly includes at least one axle adapted to position said fastener along said lift.

44. The warehouse storage system according to claim 40, wherein said mover assembly includes a motor.

45. The warehouse storage system according to claim 44, wherein said motor includes a peripheral interface controller.

46. The warehouse storage system according to claim 45, wherein said peripheral interface controller includes at least two frequencies.

47. The warehouse storage system according to claim 27, wherein said carriage includes a proximate end having a carriage guide adapted to guide said carriage along said lift.

48. The warehouse storage system according to claim 27, wherein said carriage includes a distal end substantially perpendicular to said lift in said first loading position.

49. The warehouse storage system according to claim 48, wherein said distal end includes an inclined member adapted to retain said mobile rack.

50. The warehouse storage system according to claim 27, wherein said carriage includes a back support.

51. The warehouse storage system according to claim 50, wherein said carriage includes at least one hook on said back support adapted to removably receive and secure said mobile rack to said carriage.

52. The warehouse storage system according to claim 27, wherein said carriage includes a wheel.

53. The warehouse storage system according to claim 27 further including a control to moveably position said carriage along said lift.

* * * * *